(12) United States Patent  
Dande et al.

(10) Patent No.: US 12,541,585 B2
(45) Date of Patent: Feb. 3, 2026

(54) SYSTEMS AND METHODS FOR AUTOMATICALLY GENERATING AND IMPLEMENTING PASSWORD ROTATIONS USING ARTIFICIAL INTELLIGENCE

(71) Applicant: BANK OF AMERICA CORPORATION, Charlotte, NC (US)

(72) Inventors: Pratap Dande, Saint Johns, FL (US); Elvis Nyamwange, Little Elm, TX (US); Sarveshwar Kuncha, Frisco, TX (US); Prashana Timilsina, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 85 days.

(21) Appl. No.: 18/663,574

(22) Filed: May 14, 2024

(65) Prior Publication Data

US 2025/0355992 A1 Nov. 20, 2025

(51) Int. Cl.
*G06F 21/45* (2013.01)

(52) U.S. Cl.
CPC .................................. *G06F 21/45* (2013.01)

(58) Field of Classification Search
None
See application file for complete search history.

(56) References Cited

U.S. PATENT DOCUMENTS

| | | | |
|---|---|---|---|
| 2023/0069857 A1* | 3/2023 | D'souza | G06F 21/85 |
| 2024/0152599 A1* | 5/2024 | Amit | H04L 9/0863 |
| 2025/0220038 A1* | 7/2025 | Yarabolu | H04L 63/1425 |

* cited by examiner

Primary Examiner — Nelson S. Giddins
(74) Attorney, Agent, or Firm — Moore & Van Allen PLLC; Lauren M. Stokes

(57) ABSTRACT

Systems, computer program products, and methods are described herein for automatically generating and implementing password rotations using artificial intelligence. The present invention is configured to identify at least one password rule associated with at least one application; train a machine learning model by applying the at least one password rule; determine, by the trained machine learning model, whether a password rotation requirement is present for the at least one application; generate, by an artificial intelligence (AI) bot, an updated password for the at least one application in an instance where the password rotation requirement is present; validate the updated password for the at least one application; and automatically update, based on the validation of the updated password, the at least one application with the updated password.

20 Claims, 8 Drawing Sheets

SYSTEMS AND METHODS FOR AUTOMATICALLY GENERATING AND IMPLEMENTING PASSWORD ROTATIONS USING ARTIFICIAL INTELLIGENCE

FIELD OF THE INVENTION

The present invention embraces a system for generating and implementing password rotation using artificial intelligence.

BACKGROUND

Issues often arise in computer applications which share service IDs for multiple users when password rotations are required and generating the updated passwords must be completed before expiry of the previous/current passwords and implemented in an efficient, automatic, and dynamic manner. For instance, and as password requirements and rules change and become more strict, manual password updates become more and more difficult to implement, especially when trying to avoid any downtime in an application (e.g., such as where a password has already expired, but before an updated password has been validated and implemented). Thus, a need exists for a system, computer implemented method, and computer program product that can generate and implement password rotations using artificial intelligence (AI).

Applicant has identified a number of deficiencies and problems associated with implementing password rotations in an automatic and efficient manner. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automatically generating and implementing password rotations using artificial intelligence is provided. In some embodiments, the system may comprise: a processing device; a non-transitory storage device containing instructions when executed by the processing device, causes the processing device to perform the steps of: identify at least one password rule associated with at least one application; train a machine learning model by applying the at least one password rule; determine, by the trained machine learning model, whether a password rotation requirement is present for the at least one application; generate, by an artificial intelligence (AI) bot, an updated password for the at least one application in an instance where the password rotation requirement is present; validate the updated password for the at least one application; and automatically update, based on the validation of the updated password, the at least one application with the updated password.

In some embodiments, the password rule comprises at least one of a policy or a standard associated with the at least one application.

In some embodiments, the determination that the password rotation requirement is present is based on an imminent period for the password rotation requirement.

In some embodiments, the processing device is further configured to perform the steps of automatically update a plurality of applications associated with a plurality of system identifiers with the updated password, wherein the plurality of applications shares the password rotation requirement that is present.

In some embodiments, the processing device is further configured to perform the steps of automatically update a plurality of applications based on a pre-determined queue, wherein the pre-determined queue organizes the plurality of applications for updating based on an inactive period for each application of the plurality of applications. In some embodiments, the pre-determined queue is further based on a critical level for each application of the plurality of applications, and wherein the pre-determined queue organizes the priority of updating the plurality of applications based on comparing the critical level for each application against at least one critical threshold.

In some embodiments, the at least at least one application comprises an identifier, and wherein an orchestration engine is configured to apply the updated password to the at least one application based on the identifier being next in a pre-determined queue.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
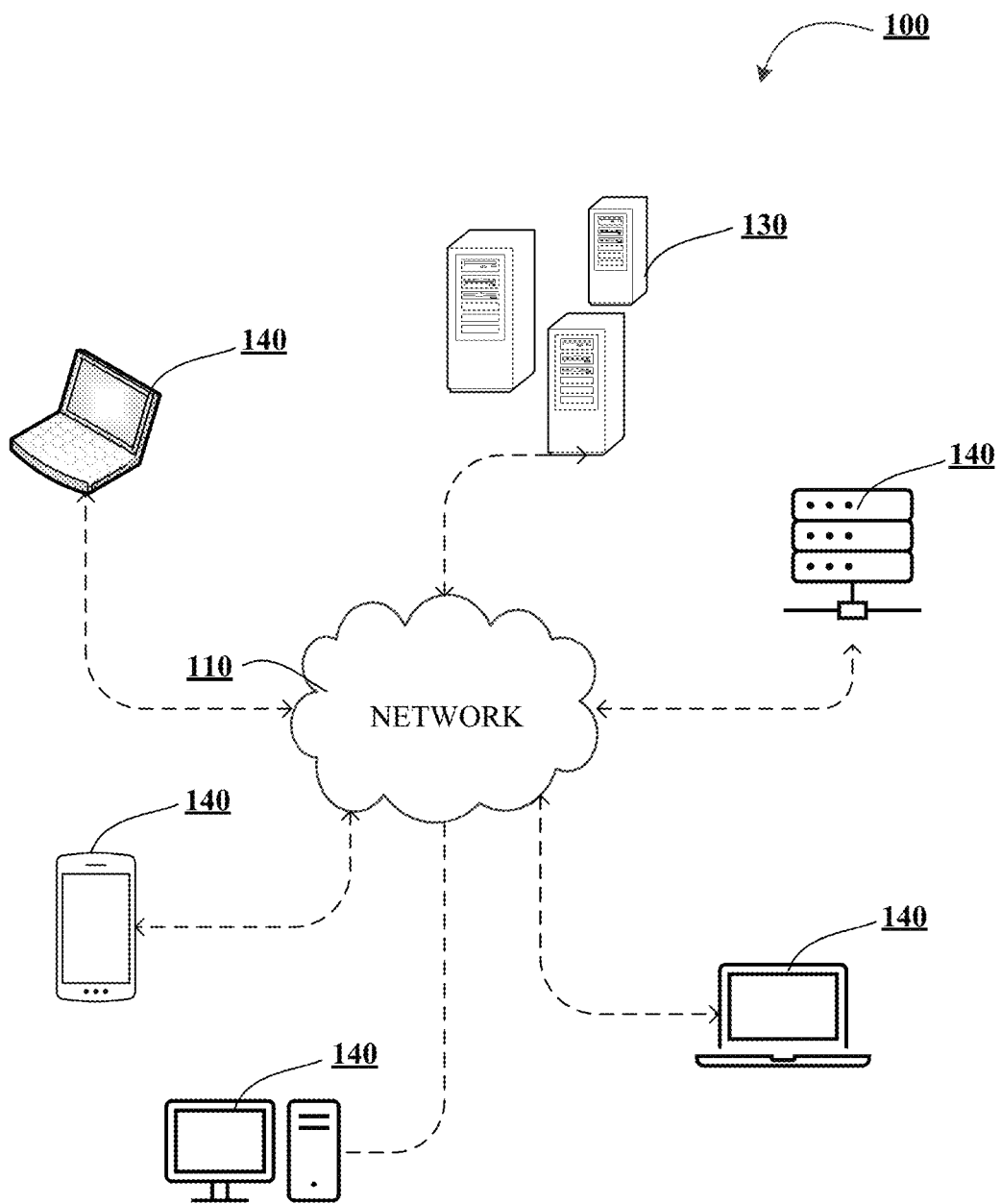
Figure 1B:
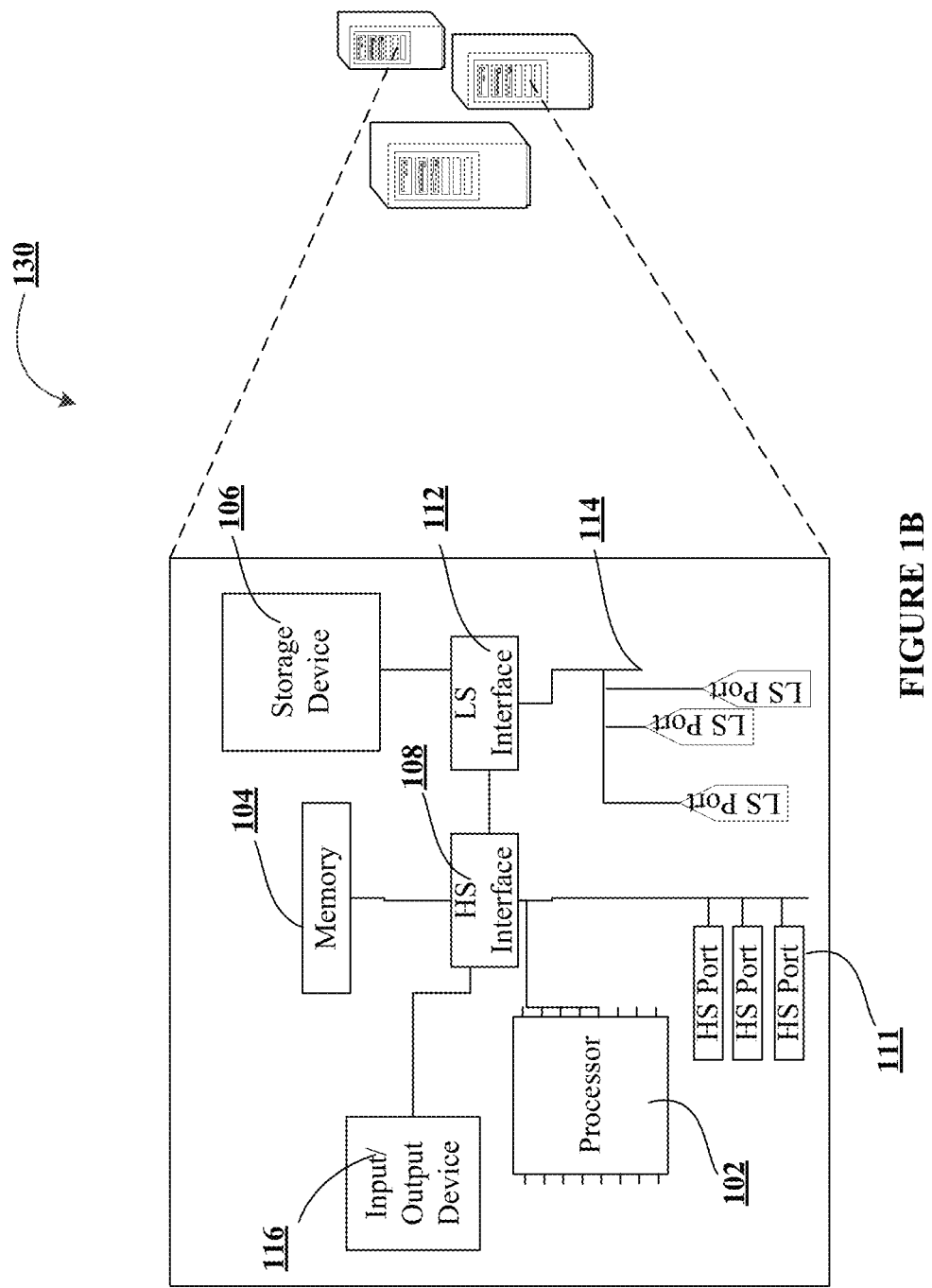
Figure 1C:
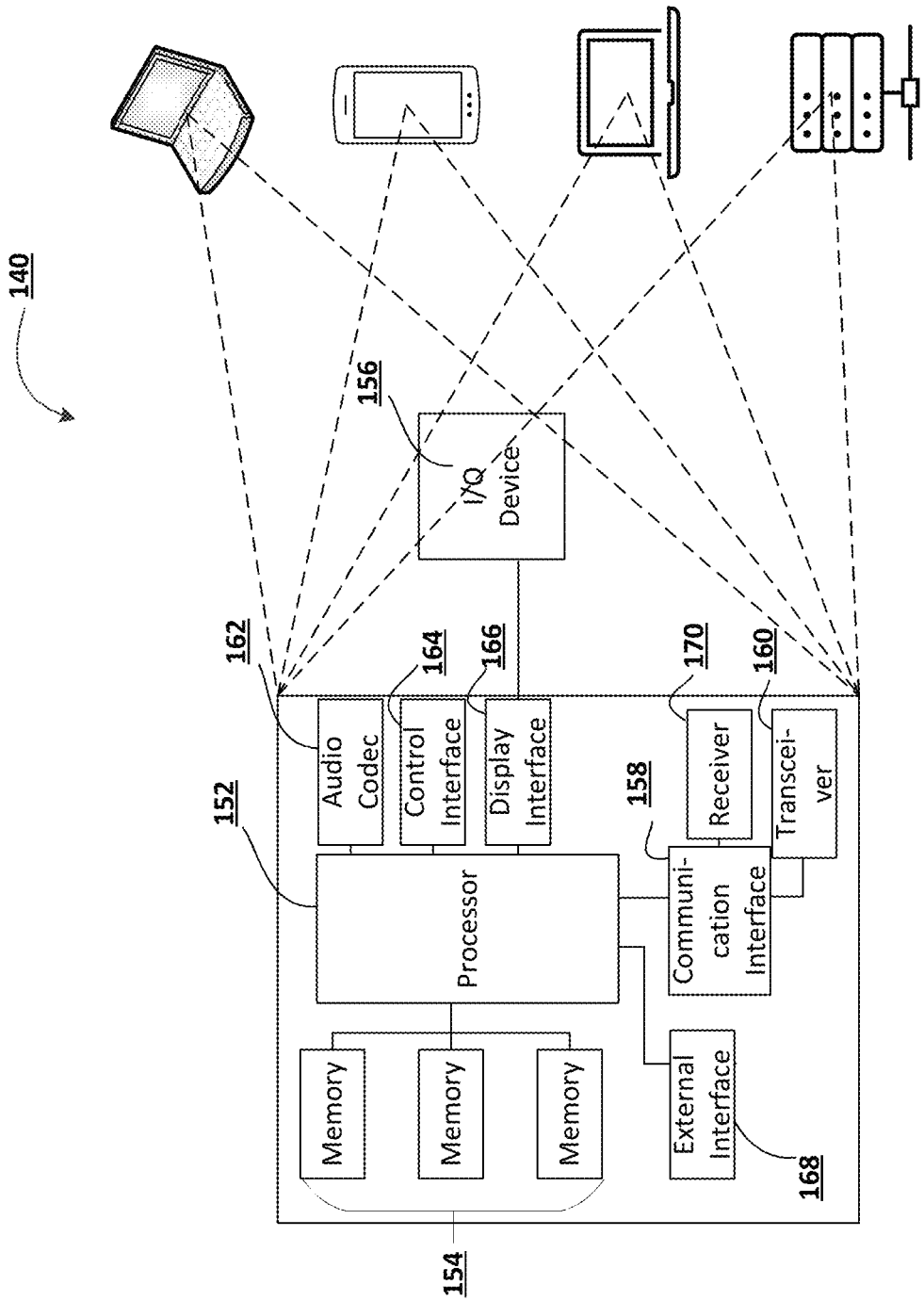
Figure 2:
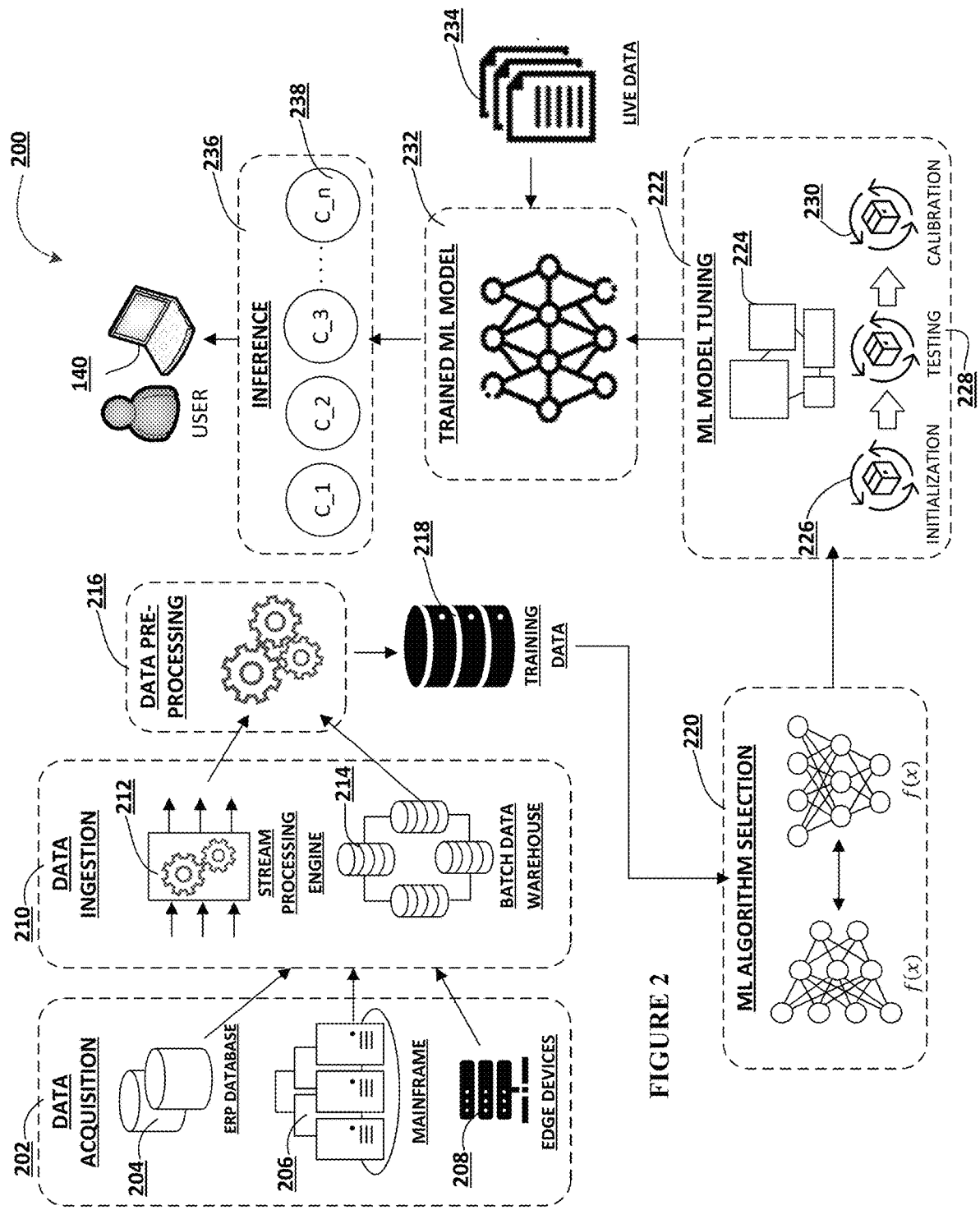
Figure 3:
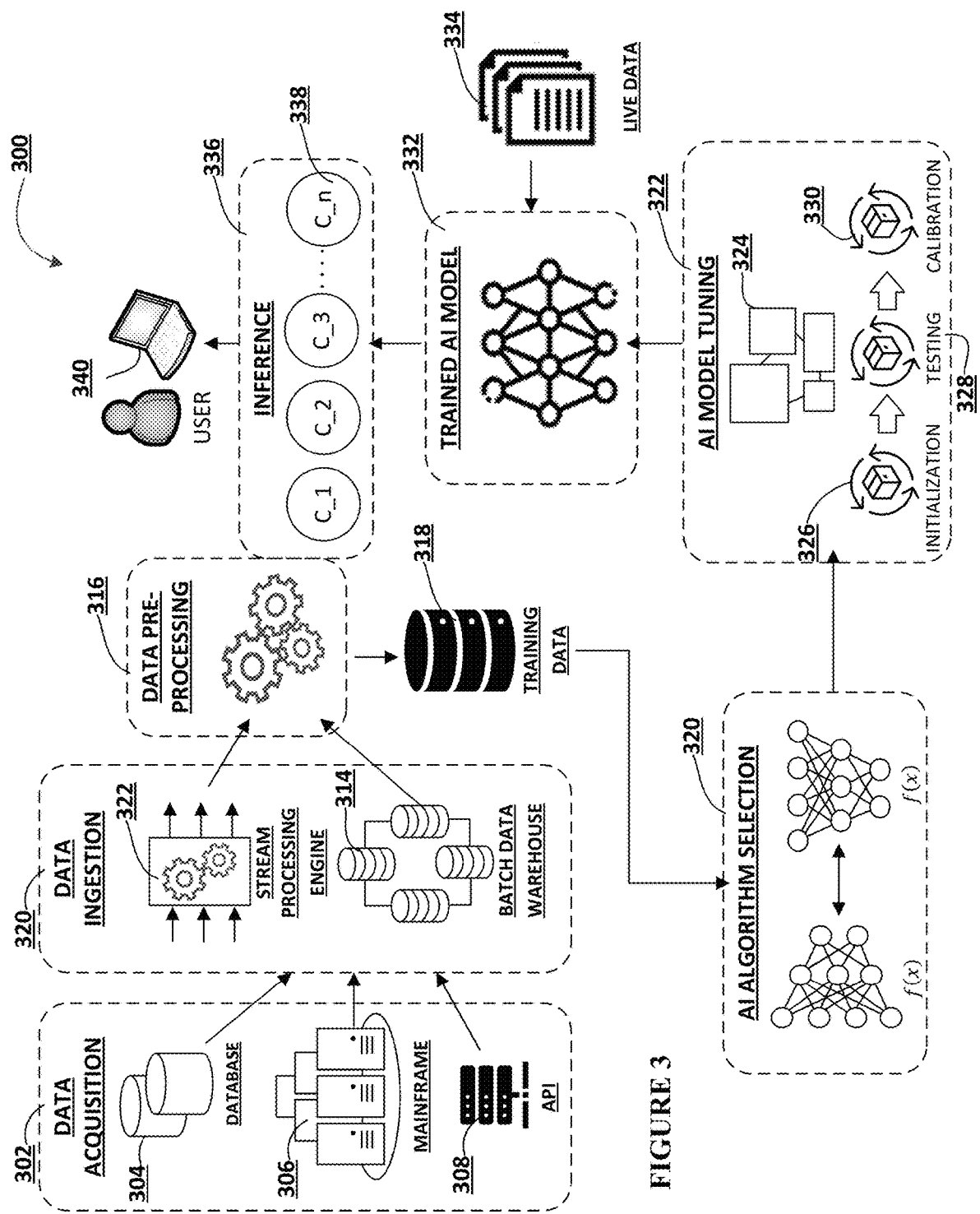
Figure 4:
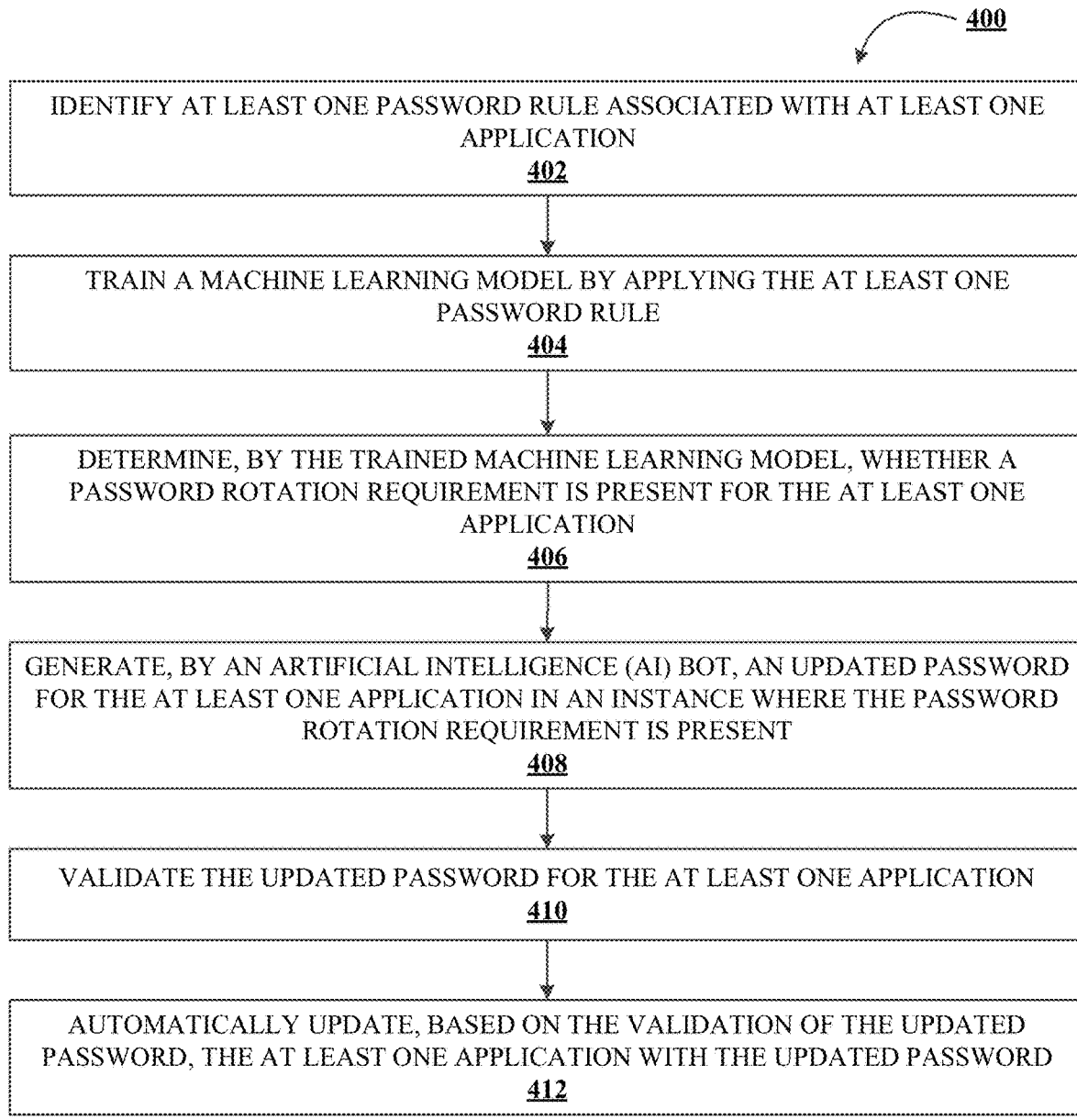
Figure 5:
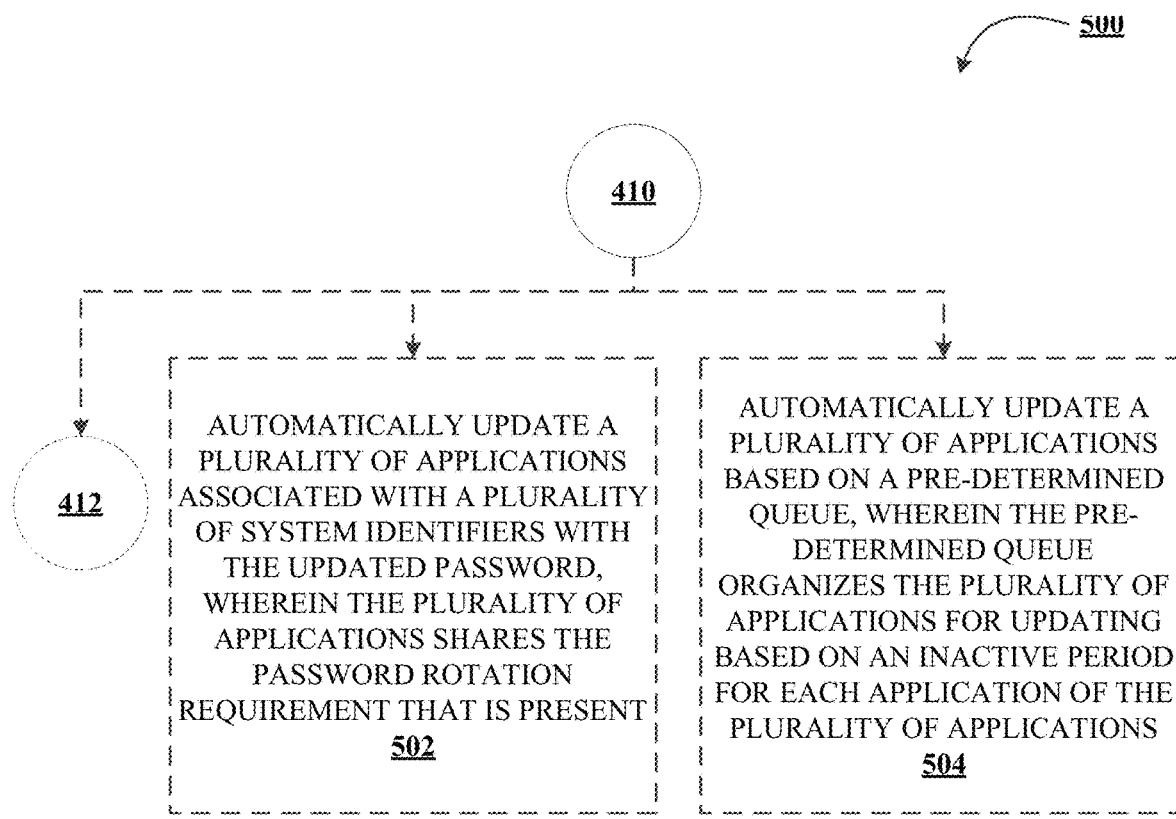
Figure 6:
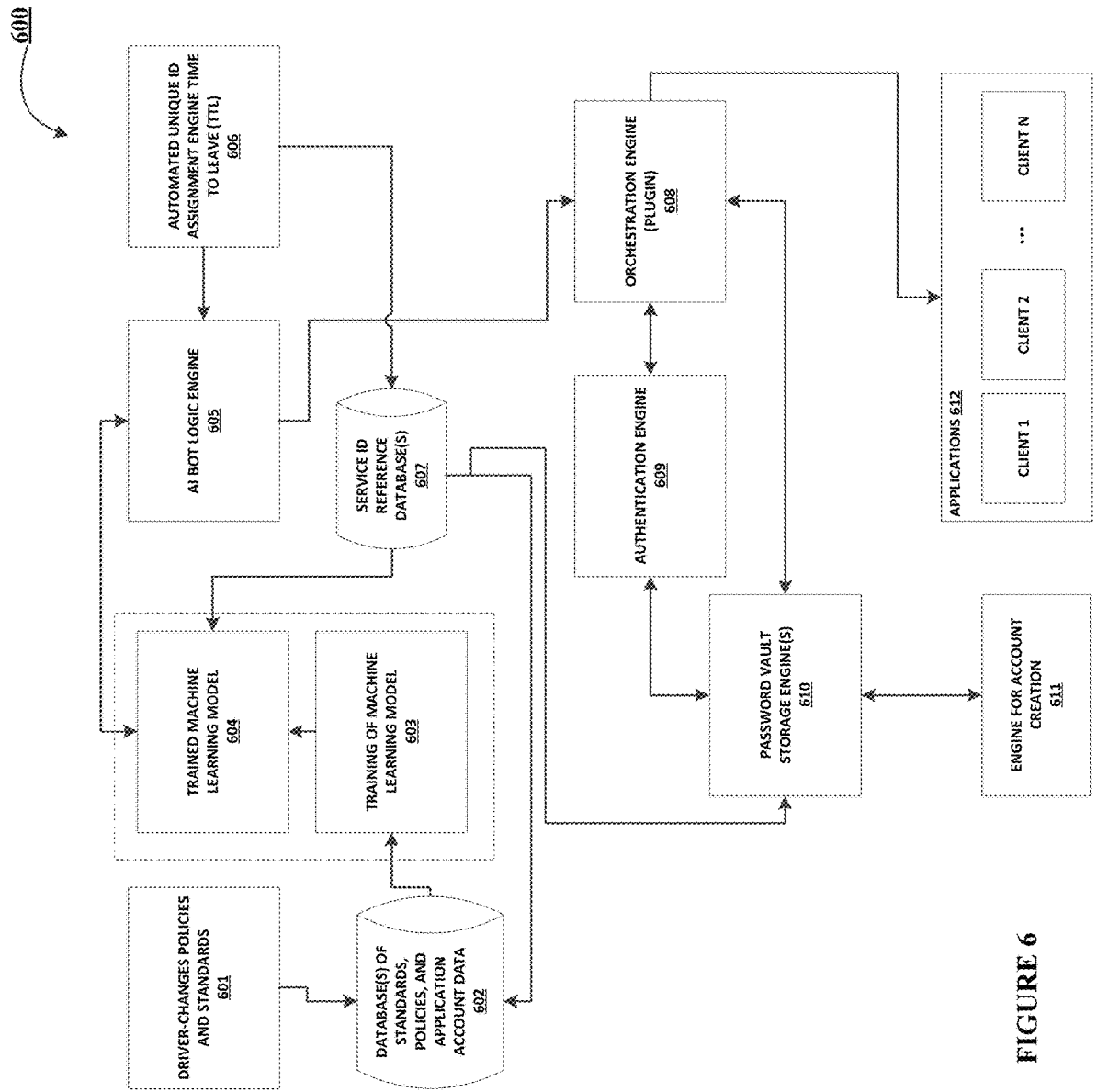

Having thus described embodiments of the invention in general terms, reference will now be made the accompanying drawings, wherein:

FIGS. 1A-1C illustrates technical components of an exemplary distributed computing environment for generating and implementing password rotation using artificial intelligence, in accordance with an embodiment of the disclosure;

FIG. 2 illustrates an exemplary machine learning (ML) subsystem architecture, in accordance with an embodiment of the disclosure FIG. 3 illustrates an exemplary artificial intelligence (AI) engine subsystem architecture, in accordance with an embodiment of the disclosure FIG. 4 illustrates a process flow for generating and implementing password rotation using artificial intelligence, in accordance with an embodiment of the disclosure;

FIG. 5 illustrates a process flow for automatically updating a plurality of applications with the updated password, in accordance with an embodiment of the disclosure; and FIG. 6 illustrates an exemplary technical component flow diagram for generating and implementing password rotation using artificial intelligence, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Issues often arise in computer applications which share service IDs for multiple users when password rotations are required and generating the updated passwords must be completed before expiry of the previous/current passwords and implemented in an efficient, automatic, and dynamic manner. For instance, and as password requirements and rules change and become more strict, manual password updates become more and more difficult to implement, especially when trying to avoid any downtime in an application (e.g., such as where a password has already expired, but before an updated password has been validated and implemented). Thus, a need exists for a system, computer implemented method, and computer program product that can generate and implement password rotations using artificial intelligence (AI).

Accordingly, the present disclosure provides an identification of at least one password rule associated with at least one application; a training of a machine learning model by applying the at least one password rule; a determination, by the trained machine learning model, whether a password rotation requirement is present for the at least one application; and a generation, by an artificial intelligence (AI) bot, of an updated password for the at least one application in an instance where the password rotation requirement is present. Further, the disclosure provides for a validation of the updated password for the at least one application; and an automatic update, based on the validation of the updated password, of the at least one application with the updated password.

In other words, the disclosure herein provides a system that automatically generates passwords for password rotations within a computer network and its associated applications, such that when a password is required to be changed (e.g., based on service legal agreements, policies, and/or the like), the system itself is tasked with generating the passwords and automatically implementing them in a password rotation to prevent interruptions or downtime in accessing the applications. Further, the system comprises an artificial intelligence bot that is integrated into the existing computing system infrastructure, and is equipped with machine learning and natural language processing to identify password change requests, and auto-generate the new passwords that adhere to the requirements of the service legal agreements, policies, and individual applications. The system additionally analyzes each application's runtime data to determine a downtime to implement the password changes, thereby ensuring that downtime due to password recovery or updates is eliminated.

What is more, the present invention provides a technical solution to a technical problem. As described herein, the technical problem includes implementing password rotations in an automatic and efficient manner. The technical solution presented herein allows for the system, computer implemented method, and computer program product for automatically generating and implementing password rotations using artificial intelligence using the steps and components herein described. In particular, the system described herein is an improvement over existing solutions to the generation and implementation of password rotations, (i) with fewer steps to achieve the solution, thus reducing the amount of computing resources, such as processing resources, storage resources, network resources, and/or the like, that are being used (e.g., by using machine learning model(s) and AI bot(s) for automatically identifying imminent and necessary password rotations for an application(s), automatically generating updated passwords, and automatically validating and implementing the updated passwords); (ii) providing a more accurate solution to problem, thus reducing the number of resources required to remedy any errors made due to a less accurate solution; (iii) removing manual input and waste from the implementation of the solution, thus improving speed and efficiency of the process and conserving computing resources (e.g., by automating the entire process herein described while securing the data and passwords during and after implementation); (iv) determining an optimal amount of resources that need to be used to implement the solution, thus reducing network traffic and load on existing computing resources (e.g., by filtering and cleansing data associated with the applications which no longer be needed for training the machine learning model). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., a system like that described herein), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary artificial intelligence (AI) engine subsystem architecture 300, in accordance with an embodiment of the disclosure. The artificial intelligence subsystem 300 may include a data acquisition engine 302, data ingestion engine 310, data pre-processing engine 316, AI engine tuning engine 322, and inference engine 336.

The data acquisition engine 302 may identify various internal and/or external data sources to generate, test, and/or integrate new features for training the artificial intelligence engine 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In artificial intelligence, the quality of data and the useful information that can be derived therefrom directly affects the ability of the artificial intelligence engine 324 to learn. The data pre-processing engine 316 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 318 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 322 may be used to train an artificial intelligence engine 324 using the training data 318 to make predictions or decisions without explicitly being programmed to do so. The artificial intelligence engine 324 represents what was learned by the selected artificial intelligence algorithm 320 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 322 may repeatedly execute cycles of experimentation 326, testing 328, and tuning 330 to optimize the performance of the artificial intelligence algorithm 320 and refine the results in preparation for deployment of those results for consumption or decision making. To this end, the AI tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 318. A fully trained artificial intelligence engine 332 is one whose hyperparameters are tuned and engine accuracy maximized.

The trained artificial intelligence engine 332, similar to any other software application output, can be persisted to storage, file, memory, or application, or looped back into the processing component to be reprocessed. More often, the trained artificial intelligence engine 332 is deployed into an existing production environment to make practical business decisions based on live data 334. To this end, the artificial intelligence subsystem 300 uses the inference engine 336 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2 \ldots C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1, C\_2 \ldots C\_n$ 338) live data 334 based on how similar they are to one another to solve exploratory challenges where little is known about the data, provide a description or label (e.g., $C\_1$, $C\_2 \ldots C\_n$ 338) to live data 334, such as in classification, and/or the like. These categorized outputs, groups (clusters), or labels are then presented to the user input system 130. In still other cases, artificial intelligence engines that perform regression techniques may use live data 334 to predict or forecast continuous outcomes.

It will be understood that the embodiment of the artificial intelligence subsystem 300 illustrated in FIG. 3 is exemplary and that other embodiments may vary. As another example, in some embodiments, the artificial intelligence subsystem 300 may include more, fewer, or different components.

FIG. 4 illustrates a process flow 400 for generating and implementing password rotation using artificial intelligence, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, a machine learning model (e.g., such as the ML engine shown in FIG. 2) and/or an artificial intelligence engine (e.g., such as the AI engine shown in FIG. 3) may perform some or all the steps described in process flow 400.

As shown in block 402, the process flow 400 may include the step of identifying at least one password rule associated with at least one application. As used herein, the password rule refers to a rule (such as a rule based on a policy or a standard) for a password change. Such a rule may comprise a rule regarding the timeline or expiration period for a password, password change requirements (such as character limit(s), non-allowable character values (e.g., letters, symbols, numbers, and/or the like which are not allowed to be part of a password)), and/or the like. In some embodiments, the password rule may be identified based on a policy generated by a government agency, by an internal-entity policy (such as within an entity's own manual or rule book), by an application's manual or rules, by compliance or regulation standards, and/or the like. In some embodiments, the policy may be identified by the system automatically crawling a policy database or standard database and/or by determining a period from the previous password's update timestamp (e.g., when the previous password/current password was updated) as compared to the password rule (e.g., the timeline or expiration period for the password), and/or the like.

Additionally, and in some embodiments, the password rule may be associated with at least one application, whereby the password rule may identify at least one application where a password rotation needs to occur (e.g., a password needs to be updated). In some embodiments, a password rule may be associated with a plurality of the same application on different client or user devices which are each associated with their own system identifier (system ID), such that when the password is updated (such as by the process described herein) everyone's system ID's password is updated automatically. In this manner, the application on each client device will not have to undergo any downtime for failure to update the password within the timeline identified by the password rule.

Thus, and as described herein, the password rule may comprise at least one of a policy or a standard associated with the at least one application. Therefore, the system may identify whether a policy and/or standard requires a password change or rotation within an imminent time (such as within the next 24-48 hours, and/or within another such pre-determined threshold time which may be determined by a manager of the system, a manager of a client's system which is a client of the system described herein, and/or the like) for a particular application. In some embodiments, the system may determine whether a policy and/or standard requires a password change or rotation within am imminent time based on the system ID associated with the application, such as where a system ID associated with a password was accidentally left off of a previous automatic update (e.g., which may have been due to an unexpected downtime of the client's system, a network interruption, and/or the like) and the system may automatically update the client-system application with the updated password when the updated password is available.

As shown in block 404, the process flow 400 may include the step of training a machine learning model by applying the at least one password rule. For example, the system may train a machine learning model to determine when a password rotation needs to occur for an application(s), such as by training the machine learning model with the current password rule(s) of an application (e.g., the current standards or policies, the current expiration period of the current password, the current expiration period of the application itself, and/or the like). In some embodiments, the machine learning model may additionally be trained on historical data of the password rotations for an application (or a plurality of applications), such that the trained machine learning model is configured to analyze and identify all the applications and their associated password rotation timelines for multiple applications operated within a client's network.

For instance, the system may train the machine learning model by applying the at least one password rule that is most current and/or at least one previous or historical password rule(s) for the instant application and/or other such applications, a database(s) of standards, policies, and application account data, and/or the like. In some embodiments, the machine learning model may further be trained by service identifiers (service IDs) and an associated database of service IDs, and/or the like. Additional embodiments for data to train the machine learning model are shown and described below with respect to FIG. 6.

Additionally, and in some embodiments, the machine learning model may be trained by applying the historical password rules and the current password rules in an iterative and continuous process, such that the machine learning model is continuously trained and refined. Additionally, and in some embodiments, the machine learning model may filter or cleanse its training data where the historical password rules are too out of date (such as where the historical password rule has been changed or updated multiple times, then the machine learning model may cleanse the historical password rule from two or more iterations before). Additionally, and in some embodiments, the machine learning model may be trained by a feedback loop from the applications as the updated passwords are implemented for the application(s) and/or from an authentication engine as the updated passwords are validated before implementation. In this manner, the machine learning model may be trained at multiple points of the process described herein, such that it is more accurate and refined in its decision-making, and such that it is up-to-date and current on its decision-making (e.g., the machine learning model is trained with the current password rotation data as it is implemented).

As shown in block 406, the process flow 400 may include the step of determining, by the trained machine learning model, whether a password rotation requirement is present for the at least one application. For example, the system—using the trained machine learning model—may determine whether a password rotation is required imminently (e.g., within the next week, within the next 48 hours, within the next 24 hours, and/or the like). Thus, and in other words, the system may determine whether the password rotation requirement is present (i.e., the password rotation is needed for an application). In some embodiments, the determination that the password rotation requirement is present is based on a determination that an updated password is required for a given application (or a plurality of applications on a plurality of devices, which may all share the same authentication credentials and/or the same password for a group of users).

In some embodiments, and as described briefly above, the determination that the password rotation requirement is present may be based on an imminent period for the password rotation requirement. For example, the imminent period may be pre-determined by a manager of the system, by a client of the system that operates and/or manages the given application, and/or by the application itself (e.g., based on rules and/or policies of the application). In some embodiments, the imminent period may be based on an imminent period threshold, such as 24 hours, 48 hours, and/or the like, such that once the imminent period threshold is met (e.g., where the imminent period threshold is 24 hours, and the system—using the machine learning model—determines that the password needs to be updated within the next 24 hours based on the password rule(s), then the system may determine that the imminent period threshold has been met), then the system will determine that the password rotation requirement is present. In some such embodiments, once the system has determined the password rotation requirement is present, the system may initiate and/or trigger the processes and steps provided further herein.

As shown in block 408, the process flow 400 may include the step of generating, by an artificial intelligence (AI) bot, an updated password for the at least one application in an instance where the password rotation requirement is present. For example, the system may generate an AI bot configured to generate updated passwords that meet the requirements and rules of an application, such that the updated password is quickly verified/authenticated and implemented in the application without any downtime. As described herein, the downtime this system prevents may refer to the downtime after a password expires and before a new/updated password is implemented, whereby the application would not be able to be used by a user(s).

In some embodiments, the AI bot may be trained based on the at least one password rule(s) (such as the password rule comprising character limit requirements, non-allowable character values, and/or the like), historical passwords used, and/or the like, for training the AI bot to generate an updated password. In some embodiments, the AI bot may additionally and/or alternatively be trained based on manual inputs of historical passwords, and/or the like. In some embodiments, the AI bot may further be trained with a feedback loop comprising manual inputs of an acceptance of an updated password, an unacceptance of the updated password, and/or the like.

As shown in block 410, the process flow 400 may include the step of validating the updated password for the at least one application. For example, the system may validate the update password by an authentication engine, which may be configured to analyze the updated password against the application's requirements, the policies' and/or standards' requirements, and/or the like. Thus, and using the authentication engine, the system may determine whether the updated password is acceptable (valid) for implementation, before automatically implementing the updated password to the application(s). Such an authentication engine is further shown and described hereinbelow with respect to FIG. 6 (e.g., authentication engine 609).

As shown in block 412, the process flow 400 may include the step of automatically updating, based on the validation of the updated password, the at least one application with the updated password. For instance, the system may automatically update the application with the updated password individually, and/or a plurality of applications (either at once or in an ordered queue). In some embodiments, the at least at least one application may comprise an identifier, which may be used by the system to identify a particular application for updating the password with the updated password. In some embodiments, the identifier may be specific to a particular application associated a particular system ID, such that only that application on that particular user device is updated by the system. In some embodiments, the identifier may comprise an application tag, which is a unique combination of alphanumeric characters used to uniquely identify an application.

In some embodiments, an orchestration engine may be configured to apply the updated password to the at least one application based on the identifier being next in a pre-determined queue. Such an embodiment of an ordered queue for updating the applications are shown and described below with respect to FIG. 5.

FIG. 5 illustrates a process flow 500 for automatically updating a plurality of applications with the updated password, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, a machine learning model (e.g., such as the ML engine shown in FIG. 2) and/or an artificial intelligence engine (e.g., such as the AI engine shown in FIG. 3) may perform some or all the steps described in process flow 500.

In some embodiments, and as shown in block 502, the process flow 500 may include the step of automatically updating a plurality of applications associated with the plurality of system identifiers with the updated password, wherein the plurality of applications shares the password rotation requirement is present. For example, and in some embodiments, of the applications that share the same presence of the password rotation requirement (e.g., all the applications that are the same, but on different user devices) may be updated with the updated password based on a pre-determined queue which determines which application will be updated when with the updated password. In some embodiments, the updating of the applications with the updated password may be based on the pre-determined queue and based on inactivity or an expected inactivity for the application (such as over a weekend where the application is unlikely to be used). Such a determination of an expected inactivity may be based on tracking and/or monitoring user activity of the application for a historical period, such as a historical period of two weeks, a month, three months, six months, and/or the like. In some such embodiments, the historical period may be used by the system to anticipate or determine an expected inactivity period (such as a particular time of day, a particular day, and/or the like) to update the application without interrupting the application's use by a user.

In some embodiments, and as shown in block 504, the process flow 500 may include the step of automatically updating a plurality of applications based on a pre-determined queue, wherein the pre-determined queue organizes the plurality of applications for updating based on an inactive period for each application of the plurality of applications. For example, and in some embodiments, the system may update a plurality of applications based on the pre-determined queue which comprises an organization and/or a ranking of the applications to be updated with the updated password in a particular order for the implementing. In some embodiments, the pre-determined queue may be dynamically updated based on current data of each application, such as where an application is supposed to be in an inactivity period, but a user is currently using the application, then the system may move down to the next application in the pre-determined queue.

In some embodiments, the pre-determined queue may be updated based on the queue as described above with respect to block 502 (based on inactivity) and/or based on a criticality level as well, whereby the more critical the application associated with the system ID is, the greater the need to update the application with the updated password first. Thus, and where there is a plurality of inactive applications expected, the more critical application is updated with the updated password first.

In some embodiments, the pre-determined queue is may further be based on a critical level for each application of the plurality of applications, and the pre-determined queue organizes the priority of updating the plurality of applications based on comparing the critical level for each application against at least one critical threshold. For example, the critical threshold, or a plurality of critical thresholds may be compared to the criticality level of an application(s) to determine when each application should be updated. For example, a low critical threshold may indicate that the criticality of the application is low when the criticality level does not meet the low critical threshold. Additionally, and for example, where the criticality level meets only the low critical threshold then the criticality of the application may be medium. Further, and where the critical level meets and/or exceeds the low and medium critical thresholds, then the criticality of the application may be high. In some embodiments, the criticality level may comprise a numerical value, a letter grade, and/or the like. Similarly, and in some embodiments, the critical threshold may comprise a numerical value, a letter grade, and/or the like.

In some embodiments, the processes described herein with respect to process flow 500 may occur in parallel together with and with the process shown and described with respect to block 412 of FIG. 2, and/or may occur in place of each other and in place of the process described with respect to block 412.

FIG. 6 illustrates an exemplary technical component flow diagram 600 for generating and implementing password rotation using artificial intelligence, in accordance with an embodiment of the disclosure. In some embodiments, a system (e.g., similar to one or more of the systems described herein with respect to FIGS. 1A-1C) may perform one or more of the steps of technical component flow diagram 600. For example, a system (e.g., the system 130 described herein with respect to FIG. 1A-1C) may perform the steps of technical component flow diagram 600. In some embodiments, a machine learning model (e.g., such as the ML engine shown in FIG. 2) and/or an artificial intelligence engine (e.g., such as the AI engine shown in FIG. 3) may perform some or all the steps described in technical component flow diagram 600.

As shown in technical component flow diagram 600, the processes described herein may comprise a driver-changes policies and standards 601 which collects each of the standards and policies changes that have occurred for an application, for an entity associated with an application (such as an entity or client using an application), and/or the like, and inputs the changes to the policies and standards to a database(s) of standards, policies, and application account data 602. The database(s) of standards, policies, and application account data 602 may comprise the data of each standard, policy, and application account data collected within the system and used to train the machine learning model (by inputting the data of the database(s) of standards, policies, and application account data 602 to train the machine learning model 603) to generate the trained machine learning model 604. In some embodiments, the trained machine learning model 604 may further be trained with the service ID reference database(s) 607 which may comprise service IDs associated with each application, user identifiers for each user of the application, and/or the like. As used herein, the service IDs may act as a password for multiple applications used by multiple users and on different user devices, whereby these service IDs may be the passwords that are updated with the updated passwords generated by the process described herein.

Upon generating the trained machine learning model 604, the trained machine learning model 604 may interact with and transmit data with an AI bot logic engine 605, which is configured to generate the updated passwords for each application. As shown herein, an automated unique ID assignment engine time to leave (TTL) 606 component which may be configured to track the TTL of each application and its password rotation schedule (e.g., every 180 days, the password rotation must occur) and other such data needed by the AI bot to generate the updated password. For instance, the automated unique ID assignment engine TTL 606 may store secret identifiers and/or secret authentication credentials, such as a secured usernames and/or the like. In some embodiments, such data may additionally be input to the service ID reference database(s) 607 for associating with the current passwords/service IDs.

Upon generating the updated password by the AI bot, the system may additionally input the updated password to the orchestration engine 608 (which may be a plugin), which is configured to validate the updated password with the authentication engine 609. Upon validating the updated password, the orchestration engine 608 may receive a trigger or transmission indicating the validity of the updated password and may apply the updated password to the applications 612 on each client device (e.g., Client 1, Client 2, . . . Client N) until the updated password has been implemented on each application and on each client device.

Additionally, and in some embodiments, the system may comprise a password vault storage engine(s) 610, which is configured to receive the validated updated password from the authentication engine 609 and store the updated password in its vault. In this manner, the updated password (and other such historical passwords may be stored and protected). In some embodiments, the service ID reference database(s) may additionally input its data (e.g., historical service IDs and associated data) to the database(s) of standards, policies, and application account data 602 and/or the password vault storage engine(s) 610 for further protection and storage.

In some embodiments, the password vault storage engine(s) 610 may send and/or receive data to and/or from the engine for account creation 611, which is configured to generate accounts for new users of an application, which may further comprise implementing the most-recent updated password generated by the system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatically generating and implementing password rotations using artificial intelligence, the system comprising:
   a processing device;
   a non-transitory storage device containing instructions when executed by the processing device, causes the processing device to perform the steps of:
   identify at least one password rule associated with at least one application;
   train a machine learning model by applying the at least one password rule;
   determine, by the trained machine learning model, whether a password rotation requirement is present for the at least one application;
   generate, by an artificial intelligence (AI) bot, an updated password for the at least one application in an instance where the password rotation requirement is present;
   validate the updated password for the at least one application; and
   automatically update, based on the validation of the updated password, the at least one application with the updated password.

2. The system of claim 1, wherein the password rule comprises at least one of a policy or a standard associated with the at least one application.

3. The system of claim 1, wherein the determination that the password rotation requirement is present is based on an imminent period for the password rotation requirement.

4. The system of claim 1, wherein the processing device is further configured to perform the steps of:
   automatically update a plurality of applications associated with a plurality of system identifiers with the updated password, wherein the plurality of applications shares the password rotation requirement that is present.

5. The system of claim 1, wherein the processing device is further configured to perform the steps of:
   automatically update a plurality of applications based on a pre-determined queue, wherein the pre-determined queue organizes the plurality of applications for updating based on an inactive period for each application of the plurality of applications.

6. The system of claim 5, wherein the pre-determined queue is further based on a critical level for each application of the plurality of applications, and wherein the pre-determined queue organizes the priority of updating the plurality of applications based on comparing the critical level for each application against at least one critical threshold.

7. The system of claim 1, wherein the at least at least one application comprises an identifier, and wherein an orchestration engine is configured to apply the updated password to the at least one application based on the identifier being next in a pre-determined queue.

8. A computer program product for automatically generating and implementing password rotations using artificial intelligence, the computer program product comprising a non-transitory computer-readable medium comprising code causing an apparatus to:
   identify at least one password rule associated with at least one application;
   train a machine learning model by applying the at least one password rule;
   determine, by the trained machine learning model, whether a password rotation requirement is present for the at least one application;
   generate, by an artificial intelligence (AI) bot, an updated password for the at least one application in an instance where the password rotation requirement is present;
   validate the updated password for the at least one application; and
   automatically update, based on the validation of the updated password, the at least one application with the updated password.

9. The computer program product of claim 8, wherein the password rule comprises at least one of a policy or a standard associated with the at least one application.

10. The computer program product of claim 8, wherein the determination that the password rotation requirement is present is based on an imminent period for the password rotation requirement.

11. The computer program product of claim 8, wherein the code further causes the apparatus to:
   automatically updating a plurality of applications associated with a plurality of system identifiers with the updated password, wherein the plurality of applications share the password rotation requirement that is present.

12. The computer program product of claim 8, wherein the code further causes the apparatus to:
   automatically update a plurality of applications based on a pre-determined queue, wherein the pre-determined queue organizes the plurality of applications for updating based on an inactive period for each application of the plurality of applications.

13. The computer program product of claim 12, wherein the pre-determined queue is further based on a critical level for each application of the plurality of applications, and wherein the pre-determined queue organizes the priority of updating the plurality of applications based on comparing the critical level for each application against at least one critical threshold.

14. The computer program product of claim 8, wherein the at least at least one application comprises an identifier, and wherein an orchestration engine is configured to apply the updated password to the at least one application based on the identifier being next in a pre-determined queue.

15. A computer-implemented method for automatically generating and implementing password rotations using artificial intelligence, the computer-implemented method comprising:
   identifying at least one password rule associated with at least one application;
   training a machine learning model by applying the at least one password rule;
   determining, by the trained machine learning model, whether a password rotation requirement is present for the at least one application;
   generating, by an artificial intelligence (AI) bot, an updated password for the at least one application in an instance where the password rotation requirement is present;
   validating the updated password for the at least one application; and
   automatically updating, based on the validation of the updated password, the at least one application with the updated password.

16. The computer-implemented method of claim 15, wherein the password rule comprises at least one of a policy or a standard associated with the at least one application.

17. The computer-implemented method of claim 15, wherein the determination that the password rotation requirement is present is based on an imminent period for the password rotation requirement.

18. The computer-implemented method of claim 1, further comprising:
   automatically updating a plurality of applications associated with a plurality of system identifiers with the updated password, wherein the plurality of applications share the password rotation requirement that is present.

19. The computer-implemented method of claim 15, further comprising:
   automatically updating a plurality of applications based on a pre-determined queue, wherein the pre-determined queue organizes the plurality of applications for updating based on an inactive period for each application of the plurality of applications.

20. The computer-implemented method of claim 19, wherein the pre-determined queue is further based on a critical level for each application of the plurality of applications, and wherein the pre-determined queue organizes the priority of updating the plurality of applications based on comparing the critical level for each application against at least one critical threshold.

* * * * *